United States Patent
Ohnishi et al.

(10) Patent No.: US 10,301,415 B2
(45) Date of Patent: May 28, 2019

(54) POLYMERIZABLE COMPOSITION FOR OPTICAL MEMBER, OPTICAL MEMBER, AND SPECTACLE LENS BASE

(71) Applicants: Tomofumi Ohnishi, Tokyo (JP); Masahisa Kousaka, Tokyo (JP)

(72) Inventors: Tomofumi Ohnishi, Tokyo (JP); Masahisa Kousaka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 15/562,767

(22) PCT Filed: Mar. 31, 2016

(86) PCT No.: PCT/JP2016/060731
§ 371 (c)(1),
(2) Date: Sep. 28, 2017

(87) PCT Pub. No.: WO2016/159263
PCT Pub. Date: Oct. 6, 2016

(65) Prior Publication Data
US 2018/0079848 A1 Mar. 22, 2018

(30) Foreign Application Priority Data
Mar. 31, 2015 (JP) ................................. 2015-072031

(51) Int. Cl.
| | |
|---|---|
| *G02B 5/23* | (2006.01) |
| *C08F 290/06* | (2006.01) |
| *G02C 7/10* | (2006.01) |
| *C08G 18/06* | (2006.01) |
| *C08K 5/1545* | (2006.01) |
| *C08K 5/18* | (2006.01) |
| *C08K 5/3435* | (2006.01) |
| *C08K 5/357* | (2006.01) |
| *G02B 1/04* | (2006.01) |
| *C08F 222/10* | (2006.01) |
| *C08G 18/67* | (2006.01) |
| *C08G 18/76* | (2006.01) |
| *C08G 18/24* | (2006.01) |

(52) U.S. Cl.
CPC .... *C08F 290/067* (2013.01); *C08F 222/1006* (2013.01); *C08F 290/06* (2013.01); *C08G 18/244* (2013.01); *C08G 18/6795* (2013.01); *C08G 18/7671* (2013.01); *C08K 5/1545* (2013.01); *C08K 5/18* (2013.01); *C08K 5/3435* (2013.01); *C08K 5/357* (2013.01); *G02B 1/041* (2013.01); *G02B 5/23* (2013.01); *G02C 7/10* (2013.01); *G02C 7/102* (2013.01)

(58) Field of Classification Search
USPC ........................ 351/159.61; 252/586; 528/66
See application file for complete search history.

(56) References Cited

U.S. PATENT DOCUMENTS

| | | | |
|---|---|---|---|
| 5,200,483 A | 4/1993 | Selvig | |
| 5,763,511 A | 6/1998 | Chan et al. | |
| 6,602,929 B1 | 8/2003 | Ohba et al. | |
| 8,343,391 B2* | 1/2013 | Schlunt | G02B 5/23 106/287.24 |
| 2005/0168690 A1* | 8/2005 | Kawai | B29C 39/025 351/159.6 |
| 2012/0228567 A1 | 9/2012 | Izumi et al. | |
| 2014/0043586 A1* | 2/2014 | Hiraren | C09K 9/02 351/159.61 |

FOREIGN PATENT DOCUMENTS

| | | |
|---|---|---|
| EP | 2698664 A1 | 2/2014 |
| JP | H07-501091 A | 2/1995 |
| JP | H10-510872 A | 10/1998 |
| JP | 2001-48942 A | 2/2001 |
| JP | 2005-263988 A | 9/2005 |
| WO | 2011/059117 A1 | 5/2011 |
| WO | 2014/002844 A1 | 1/2014 |

OTHER PUBLICATIONS

Jun. 21, 2016 International Search Report issued in International Patent Application No. PCT/JP2016/060731.

* cited by examiner

Primary Examiner — Tae H Yoon
(74) Attorney, Agent, or Firm — Oliff PLC

(57) ABSTRACT

Provided is a polymerizable composition for an optical component which has excellent coloring performance. [1] A polymerizable composition for an optical component, including a urethane acrylate represented by general formula (1), and a photochromic compound. [2] An optical component obtained by polymerizing the polymerizable composition. [3] A spectacle lens substrate formed from the optical component.

18 Claims, No Drawings

POLYMERIZABLE COMPOSITION FOR OPTICAL MEMBER, OPTICAL MEMBER, AND SPECTACLE LENS BASE

CROSS-REFERENCE TO RELATED APPLICATIONS

This application is a 371 National Stage Application, which claims the benefit of International Application No. PCT/JP2016/060731, filed on Mar. 31, 2016, which claims priority to Japanese Patent Application No. 2015-072031, filed on Mar. 31, 2015, the contents of which are hereby incorporated by references in their entirety.

TECHNICAL FIELD

The present disclosure relates to a polymerizable composition for an optical component, an optical component, and a spectacle lens substrate, and more particularly to a polymerizable composition for an optical component including a photochromic compound.

BACKGROUND ART

Spectacle lenses using photochromic compounds are commercially available. Such lenses have an antiglare effect as high-density color lenses by developing color in bright outdoors and recover high transparency when transferred indoors.

PTL 1 describes a composition for an optical material including one or more isocyanate compounds selected from an aliphatic isocyanate compound and an alicyclic isocyanate compound, a bifunctional or higher functional active hydrogen compound, and a photochromic compound.

CITATION LIST

Patent Literature

[PTL 1] WO 2014/002844

SUMMARY

Technical Problem

In a urethane polymerizable composition, the coloring performance of the photochromic compound is lost after curing, and it is difficult to obtain an optical component having excellent coloring performance.

Accordingly, in an embodiment of the present disclosure, there is provided a polymerizable composition for an optical component, an optical component, and a spectacle lens substrate having excellent coloring performance.

Solution to Problem

The inventors of the present disclosure have found that by using a specific urethane acrylate, high coloring performance of the photochromic compound can be maintained even after curing. This finding led to the completion of the present disclosure.

Thus, the present disclosure relates to the following [1] to [3].

[1] A polymerizable composition for an optical component, including a urethane acrylate represented by general formula (1), and a photochromic compound:

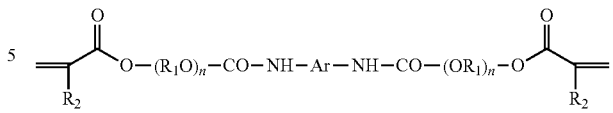

wherein, in the formula, Ar represents a residue obtained by removing an isocyanate group from an aromatic diisocyanate compound, $R_1$ represents an alkanediyl group having 2 to 4 carbon atoms, and $R_2$ represents a hydrogen atom or a methyl group; n represents an average number of moles added, and is 2 to 8].

An optical component obtained by polymerizing the polymerizable composition according to clause [1].

A spectacle lens substrate formed from the optical component according to clause [2].

Advantageous Effects of Invention

According to the present disclosure, it is possible to provide a polymerizable composition for an optical component, an optical component, and a spectacle lens substrate having excellent coloring performance.

DESCRIPTION OF EMBODIMENTS

[Polymerizable Composition for Optical Component]

The polymerizable composition for an optical component of the present disclosure includes a urethane acrylate represented by general formula (1), and a photochromic compound. It is conceivable that by including the urethane acrylate represented by general formula (1), it is possible to obtain an optical component which has excellent coloring performance and in which structural changes of the photochromic compound caused by light in the resin matrix are unlikely to be inhibited even in the composition after curing.

<Urethane Acrylate>

The urethane acrylate used in the present disclosure is represented by the following general formula (1). By using the urethane acrylate, it is possible to obtain an optical component having excellent coloring performance, high toughness and high refractive index,

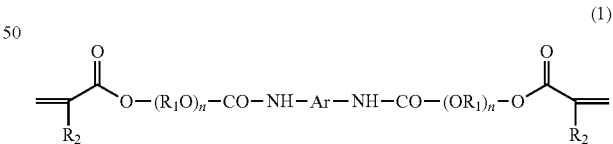

wherein, in the formula, Ar represents a residue obtained by removing an isocyanate group from an aromatic diisocyanate compound, $R_1$ represents an alkanediyl group having 2 to 4 carbon atoms, and $R_2$ represents a hydrogen atom or a methyl group; n represents an average number of moles added, and is 2 to 8.

Ar is a residue obtained by removing an isocyanate group from an aromatic diisocyanate compound in order to obtain excellent toughness.

In order to obtain excellent toughness, Ar may have a structure represented by the following general formula (a):

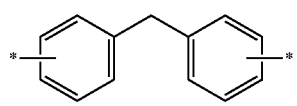

(a)

wherein, in the formula, * represents a binding site.

In the above structure, the binding site * is exemplified by a 4,4'-position and a 2,4'-position, among which the 4,4'-position may have better.

Examples of the aromatic diisocyanate include sulfur-free aromatic isocyanates such as 4,4'-diphenylmethane diisocyanate, 2,4'-diphenylmethane diisocyanate, paraphenylene diisocyanate, metaphenylene diisocyanate, 2,6-tolylene diisocyanate, 2,4-tolylene diisocyanate, paraxylylene diisocyanate, metaxylylene diisocyanate, paratetramethylxylylene diisocyanate, metaparatetramethylxylylene diisocyanate, 2,6-naphthalene diisocyanate, 1,5-naphthalene diisocyanate, and the like; and sulfur-containing isocyanate compounds such as diphenyl disulfide-4,4'-diisocyanate, 2,2'-dimethyldiphenyl disulfide-5,5'-diisocyanate, 3,3'-dimethyldiphenyl disulfide-5,5'-diisocyanate, 3,3'-dimethyldiphenyl disulfide-6,6'-diisocyanate, 4,4'-dimethyldiphenyl disulfide-5,5'-diisocyanate, 3,3'-dimethoxydiphenyl disulfide-4,4'-diisocyanate, 4,4'-dimethoxydiphenyl disulfide-3,3'-diisocyanate, diphenylsulfone-4,4'-diisocyanate, diphenylsulfone-3,3'-diisocyanate, benzylidenesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenylsulfone-3,3'-diisocyanate, 4,4'-dimethoxybenzene -ethylenedisulfone-3,3'-diisocyanate, 4,4'-dichlorodiphenylsulfone-3,3'-diisocyanate, 4-methyl-3-isocyanatobenzenesulfonyl-4'-isocyanatophenol ester, 4-methoxy-3-isocyanatobenzenesulfonyl-4'-isocyanatophenol ester, 4-methyl-3-isocyanatobenzenesulfonylanilide-3'-methyl-4'-isocyanate, dibenzenesulfonyl-ethylenediamine-4,4'-diisocyanate, 4,4'-dimethoxybenzenesulfonyl-ethylenediamine-3,3'-diisocyanate, 4-methyl-3-isocyanatobenzenesulfonylanilide-4-methyl-3'-isocyanate, thiophene-2,5-diisocyanate, thiophene-2,5-diisocyanatomethyl and the like.

Among them, at least one of 4,4'-diphenylmethane diisocyanate, 2,4'-diphenylmethane diisocyanate, 2,6-tolylene diisocyanate, 2,4-tolylene diisocyanate, paraxylylene diisocyanate, and metaxylylene diisocyanate may have better, 4,4'-diphenylmethane diisocyanate may have better.

$R_1$ may be an alkanediyl group having 2 or 3 carbon atoms, and an ethanediyl group.

$R^2$ may be a methyl group.

n represents an average number of moles added; from the viewpoint of maintaining excellent light control of the photochromic compound after curing of the composition, this number is 2 to 8, and may be 3 to 6, and 4 to 6.

The urethane acrylate may be a compound represented by the following general formula (11):

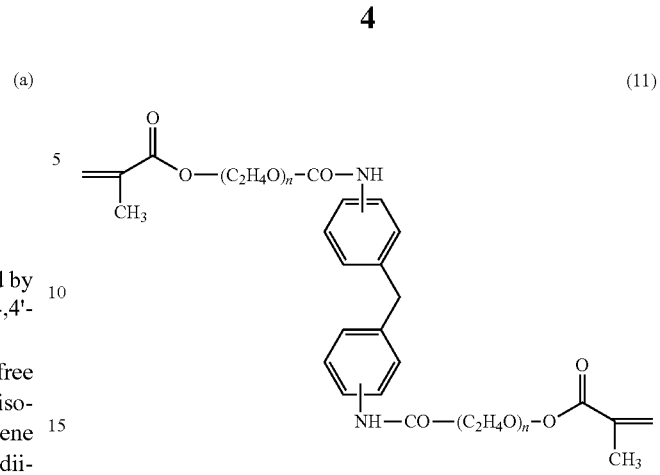

(11)

wherein, in the formula, n represents an average number of moles added and is 2 to 8, may be 3 to 6, and 4 to 6.

The urethane acrylate may be obtained, for example, by reacting an aromatic diisocyanate and a polyalkylene glycol acrylate in an amount equivalent to that of the isocyanate group in the aromatic diisocyanate. For the reaction, an organotin compound such as dimethyltin dichloride may be used as a polymerization catalyst. The reaction may be carried out at a temperature of 25° C. to 80° C. under a nitrogen atmosphere.

The content of the urethane acrylate in the composition may be 60% by mass or more, 70% by mass or more, 72% by mass or more, 75% by mass or more, and 80% by mass or more. The content in the composition may be 99% by mass or less, 95% by mass or less, 89% by mass or less, and 87% by mass or less.

<Other Polyfunctional (Meth)Acrylate>

The polymerizable composition for an optical component of the present disclosure may contain another polyfunctional (meth)acrylate to improve a fading rate.

The polyfunctional (meth)acrylate is exemplified by a compound represented by the following general formula (2):

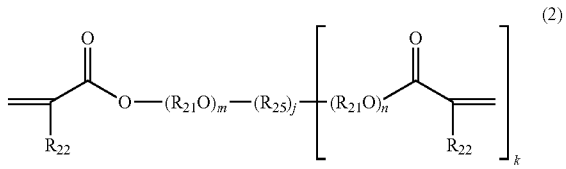

(2)

wherein, in the formula, $R_{21}$ represents an alkanediyl group having 2 to 4 carbon atoms; $R_{22}$ represents a hydrogen atom or a methyl group; $R_{25}$ represents a residue obtained by removing a hydrogen atom of one hydroxy group and k hydroxy groups from a (k+1)-hydric or higher alcohol; j is 0 or 1, k is an integer of 1 to 3, and m and n each represent an average number of moles added, and is 0 to 30. However, when j is 0, k is 1 and n is 0.

$R_{21}$ may be an alkanediyl group having 2 or 3 carbon atoms, and an ethanediyl group.

From the viewpoint of reducing the fading time, $R_{22}$ may be a hydrogen atom.

The (k+1)-hydric or higher alcohol of $R_{25}$ (also referred to hereinbelow as "polyhydric alcohol") may be exemplified by bisphenol A [2,2-bis(4,4'-dihydroxyphenyl)propane], trimethylolpropane, pentaerythritol, dipentaerythritol and the like.

k may be 1.

m and n each represent an average number of moles added, and may be from 2 to 25, from 3 to 15, from 4 to 10, and from 4 to 6, from the viewpoint of obtaining excellent coloring performance of the photochromic compound after curing of the composition.

The polyfunctional (meth)acrylate may be exemplified by (poly)alkylene glycol di(meth)acrylates, ethoxylated bisphenol A dimethacrylate, and trimethylolpropane trimethacrylate.

From the viewpoint of improving the fading rate, the content of the polyfunctional (meth)acrylate in the composition may be 1% by mass or more, 5% by mass or more, 11% by mass or more, and 13% by mass or more. The content in the composition may be 40 mass % or less, 30 mass % or less, 28 mass % or less, 25 mass % or less, and 20 mass % or less.

Among these polyfunctional (meth)acrylates, a (poly)alkylene glycol di(meth)acrylate may have better.

[(Poly)Alkylene Glycol Di(Meth)Acrylate]

The polymerizable composition for an optical component of the present disclosure may include a (poly)alkylene glycol di(meth)acrylate.

(Poly)alkylene glycol means at least one selected from a polyalkylene glycol and an alkylene glycol.

(Meth)acrylate means at least one selected from acrylate and methacrylate.

A (poly)alkylene glycol di(meth)acrylate may be a compound represented by the following general formula (2-1):

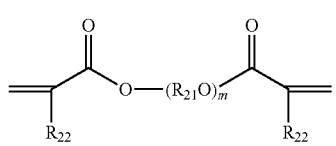

(2-1)

wherein, in the formula, $R_{21}$ represents an alkanediyl group having 2 to 4 carbon atoms, and $R_{22}$ represents a hydrogen atom or a methyl group; m represents the average number of moles added, and is 2 to 30.

Examples of $R_{21}$ are the same as those in general formula (2).

Examples of $R_{22}$ are the same as those in general formula (2).

m represents the average number of moles added. From the viewpoint of maintaining the excellent light control property of the photochromic compound after curing of the composition, this number may be from 2 to 25, from 3 to 15, from 4 to 10, and from 4 to 6.

From the viewpoint of improving the coloring performance and shortening the fading time, the (poly)alkylene glycol di(meth)acrylate may be a (poly)alkylene glycol diacrylate, and polyethylene glycol diacrylate.

Commercial products of polyethylene glycol diacrylate are exemplified by trade names A-200, A-400, A-600, and A-1000 manufactured by Shin-Nakamura Chemical Co., Ltd.

The content of the (poly)alkylene glycol di(meth)acrylate in the composition may be 1% by mass or more, 5% by mass or more, and may be from the viewpoint of further shortening the fading time, 11% by mass or more, and 13 mass % or more. The content may be 30 mass % or less, 28 mass % or less, 25 mass % or less, and 20 mass % or less.

<Other Acrylate>

The polymerizable composition for an optical component of the present disclosure may include another acrylate. Examples of the other acrylate include an alkyl methacrylate with an alkyl group having 1 to 4 carbon atoms, benzyl methacrylate, allyl phthalate and the like.

<Photochromic Compound>

Examples of the photochromic compound include fulgimide compounds, spirooxazine compounds, chromene compounds and the like.

The molecular weight of the photochromic compound may be 800 or less, 780 or less, 750 or less, in order to improve the coloring density and the fading rate. The molecular weight may be 300 or more, 400 or more, and 500 or more.

Well-known compounds may be used as the fulgimide compounds, spirooxazine compounds, and chromene compounds.

Among these photochromic compounds, the chromene photochromic compounds may have better because the durability of the photochromic property is higher than that of other photochromic compounds and the improvement of coloring density and fading rate of the photochromic property is particularly large as compared with other photochromic compounds.

Further, as the chromene photochromic compound having particularly good photochromic properties such as coloring density, color fading rate, durability and the like, those represented by the following general formula (3) may have better,

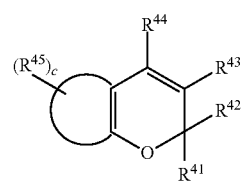

(3)

wherein, in the formula, a group represented by general formula (3a):

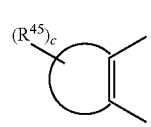

(3a)

is a substituted or unsubstituted aromatic hydrocarbon group or a substituted or unsubstituted unsaturated heterocyclic group, $R^{43}$, $R^{44}$ and $R^{45}$ are each independently a hydrogen atom, an alkyl group, an alkoxy group, an aralkoxy group, an amino group, a substituted amino group, a cyano group, a substituted or unsubstituted aryl group, a halogen atom, an aralkyl group, a hydroxyl group, a substituted or unsubstituted alkynyl group, a substituted or unsubstituted heterocyclic group which has a nitrogen atom and in which the nitrogen atom is bonded to a pyran ring or a ring of the group represented by formula (3a), or a condensed heterocyclic group in which an aromatic hydrocarbon ring or an aromatic heterocyclic ring is condensed on the heteroatom ring, and c is an integer within a range from 0 to 6, $R^{41}$ and $R^{42}$ are each independently a substituted or unsubstituted alkenyl group, a substituted or unsubstituted alkynyl group, a substituted or unsubstituted aryl group, a substituted or unsubstituted heteroaryl group, or an alkyl group, or $R^{41}$ and $R^{42}$ may form a substituted or unsubstituted aliphatic hydrocarbon ring or aromatic hydrocarbon ring.

Examples of the substituent in the substituted aryl group and substituted heteroaryl group described for $R^{41}$ and $R^{42}$ include the same groups as those relating to $R^{43}$ to $R^{44}$.

Among the chromene photochromic compounds represented by general formula (3), those represented by the following general formulas (31) to (36) may have better from the viewpoints of photochromic properties such as coloring density and fading rate and durability,

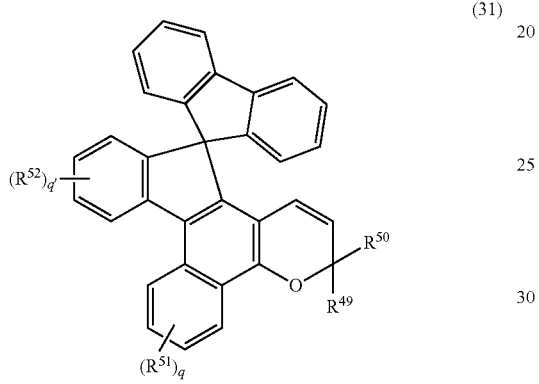
(31)

wherein, in the formula, $R^{49}$ and $R^{50}$ are the same as $R^{41}$ and $R^{42}$, respectively, of general formula (3), $R^{51}$ and $R^{52}$ are the same as $R^{45}$ of general formula (3), q and q' are each 1 or 2,

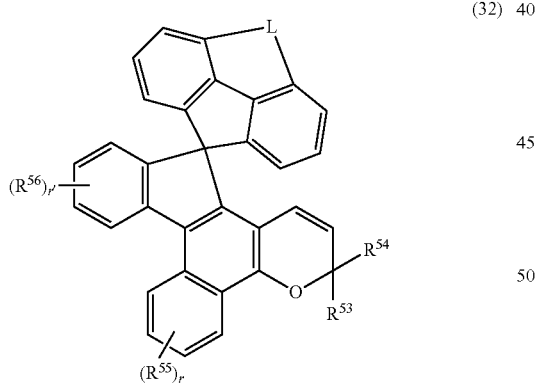
(32)

wherein, in the formula, $R^{53}$ and $R^{54}$ are the same as $R^{41}$ and $R^{42}$, respectively, of general formula (3), $R^{55}$ and $R^{56}$ are the same as $R^{45}$ of general formula (3), L is any group represented by the following formulas:

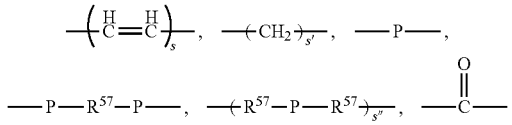

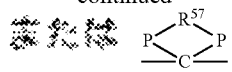

wherein, in the formulas, P is an oxygen atom or a sulfur atom, $R^{57}$ is an alkylene group having 1 to 6 carbon atoms, s, s' and s" are each an integer of 1 to 4), and r and r' are each independently 1 or 2,

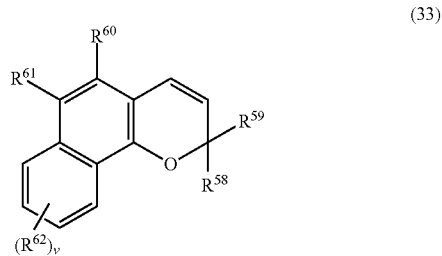
(33)

wherein, in the formula, $R^{58}$ and $R^{59}$ are the same as $R^{41}$ and $R^{42}$, respectively, of general formula (3), $R^{60}$, $R^{61}$ and $R^{62}$ are the same as $R^{45}$ of general formula (3), v is 1 or 2,

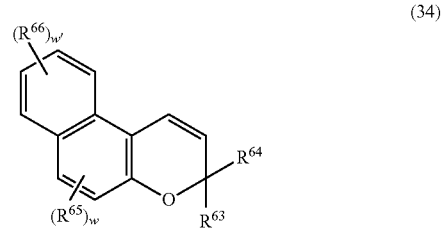
(34)

wherein, in the formula, $R^{63}$ and $R^{64}$ are the same as $R^{41}$ and $R^{42}$, respectively, of general formula (3), $R^{65}$ and $R^{66}$ are the same as $R^{45}$ of general formula (3), w and w' are each independently 1 or 2, (35)

wherein, in the formula, $R^{67}$ and $R^{68}$ are the same as $R^{41}$ and $R^{42}$, respectively, of general formula (3), $R^{69}$, $R^{70}$, $R^{71}$ and $R^{72}$ are each the same as $R^{45}$ of general formula (3), and x and x' are each independently 1 or 2,

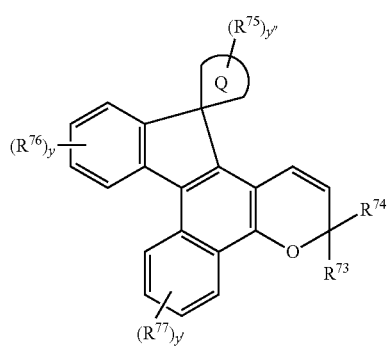

(36)

Wherein, in the formula, $R^{73}$ and $R^{74}$ are the same as $R^{41}$ and $R^{42}$, respectively, of general formula (3), and $R^{75}$, $R^{76}$ and $R^{77}$ are the same as $R^{45}$ of general formula (3),

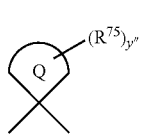

is an aliphatic hydrocarbon ring which may have at least one substituent, and each of y, y' and y" is independently 1 or 2.

Among the chromene photochromic compounds represented by general formulas (31) to (36), chromene compounds (compounds 3-1 to 3-6) having the following structures may have better.

3-1

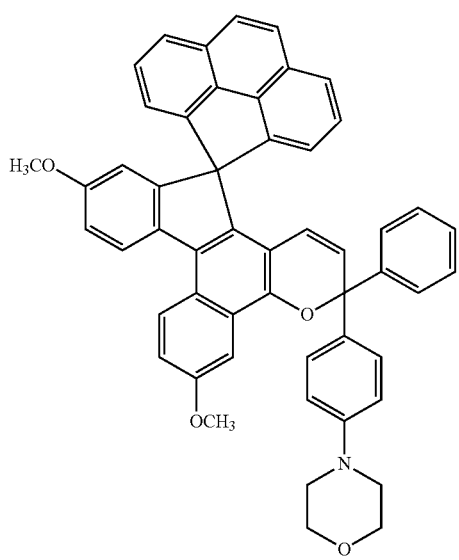

3-2

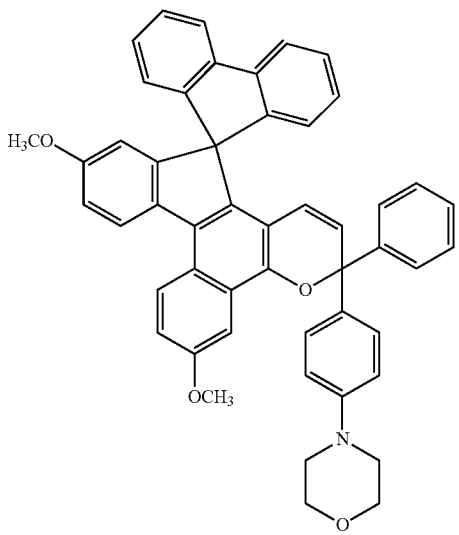

3-3

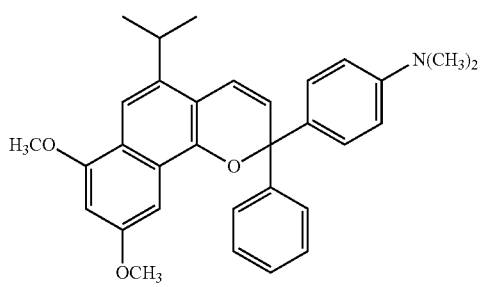

3-4

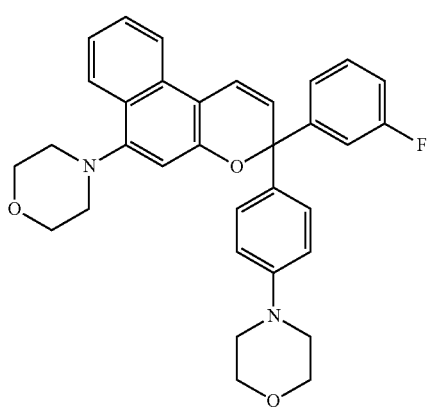

3-5

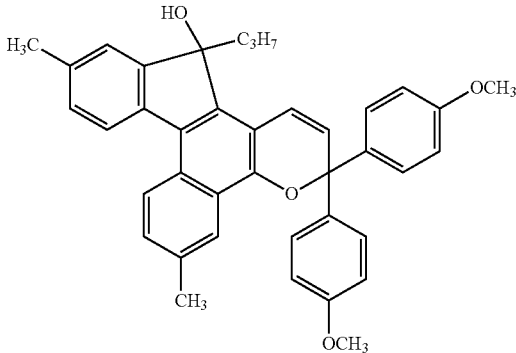

-continued 3-6

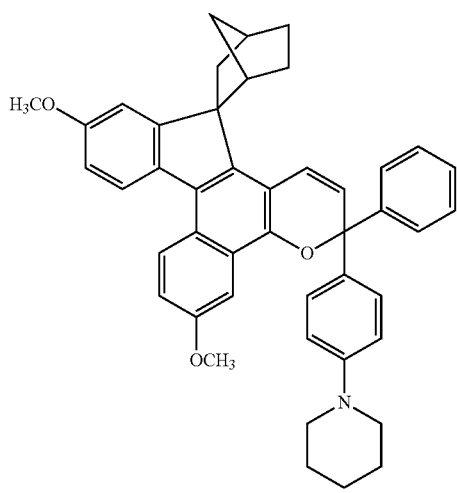

These photochromic compounds may be used by appropriately mixing a plurality of types the compounds in order to develop an appropriate color tone.

From the viewpoint of further reducing the fading time, the content of the photochromic compound in the composition may be 0.01% by mass or more, 0.03% by mass or more, and 0.05% by mass or more. The content may be 1% by mass or less, 0.5% by mass or less, and 0.1% by mass or less.

The polymerizable composition for an optical component may further include an additive such as a surfactant, an antioxidant, a radical scavenger, an ultraviolet stabilizer, an ultraviolet absorber, a release agent, a coloring inhibitor, an antistatic agent, a fluorescent dye, a dye, a pigment, a perfume, a plasticizer and the like. As these additives, known compounds may be used without any limitation.

[Method for Producing Optical Component]

A method for producing an optical component may include a step of curing the polymerizable composition for an optical component.

The step of curing may be carried out by casting the polymerizable composition into a mold obtained by assembling a glass mold or a metal mold and a resin gasket or a tape, and polymerizing the monomer by heating or ultraviolet irradiation or the like.

In the curing step, a radical initiator may be used. Examples of the radical initiator include 2,2'-azobis(2,4-dimethylvaleronitrile), 1,1-azobiscyclohexane carbonate, diisopropyl peroxycarbonate, 1,1'-azobiscyclohexane nitrate, di-tert-butyl peroxide and the like.

The compounded amount of the radical initiator may be 0.1 part by mass or more and 10 percent by mass or less with respect to 100 parts by mass of the polymerizable composition for an optical component.

[Optical Component]

The optical component of the present disclosure may be a lens substrate or a functional layer, may be a lens substrate, and a spectacle lens substrate.

The functional layer may be exemplified by at least one selected from a hard coat layer, a primer layer, an antireflection film, and a water repellent film.

The hard coat layer is provided for improving scratch resistance and may be formed by coating a coating liquid having a fine particulate inorganic material such as an organosilicon compound, tin oxide, silicon oxide, zirconium oxide, titanium oxide, and the like.

The primer layer is provided for improving impact resistance and includes, for example, polyurethane as a main component. Here, the polyurethane content in the primer layer may be 50% by mass or more.

The antireflection film may be exemplified by a film obtained by laminating silicon oxide, titanium dioxide, zirconium oxide, tantalum oxide or the like.

The water repellent film may be formed using an organosilicon compound having a fluorine atom.

When the plastic optical component of the present disclosure is used for a lens substrate, the refractive index of the lens substrate may be 1.49 or more, and 1.54 or more. The refractive index may be 1.78 or less, 1.75 or less, 1.68 or less, 1.61 or less, and 1.57 or less.

In the present disclosure, matters described as examples or preferred ranges in the detailed description of the disclosure may be arbitrarily combined with respect to the examples, contents, and physical properties of each of the above-mentioned components.

Further, where the composition described in the detailed description of the disclosure is adjusted to the composition described in the examples, the disclosed embodiments can be carried out in the same manner as in the examples over the entire composition range claimed.

EXAMPLES

The present disclosure will be specifically described hereinbelow by way of examples, but the present disclosure is not limited to these examples. Various physical properties were measured and evaluated by the following methods.

[Light Control Performance Test]

<Method for Evaluating Light Control Performance>

(a) Light transmittance at the time of color development (T $\%_{max}$): a lens was subjected to color development for 5 min by using a xenon lamp (300 W) light source device under the conditions of a temperature of 23° C. and an ultraviolet intensity of 1.2 mW/cm$^2$ measured with an integrated photometer, and a spectrum at this time was measured by the instantaneous multi-photometry system. Concerning the measured spectrum, the light transmittance at the maximum absorption wavelength ($\lambda_{max}$) is defined as the light transmittance at the time of color development (T $\%_{max}$). The lower is the light transmittance, the higher is the color density.

(b) 60% T fading time (F1/2): this time is defined as a time required for the absorbance at the maximum absorption wavelength ($\lambda_{max}$) to decrease to 60% T after the irradiation with light is stopped following the aforementioned color development for 5 min. The shorter is this time, the higher is the fading rate.

<Apparatus Used>

Light source device: a xenon lamp (300 W) device "UIT-501C", manufactured by Ushio Inc.

Integrated photometer: integrated photometer "UIT-102 (Receiver UVD365PD)", manufactured by Ushio Inc.

Instantaneous multi-photometry system: "MCPD-3000", manufactured by Otsuka Electronics Co., Ltd.

[Tensile Strength Test]

A flat plate having a diameter of 50 mm and a plate thickness of 1.8 mm was prepared and two 2.0 mm holes were opened at two locations horizontally at 1800 with respect to each other at 2 mm from the end portion. Then, SUS rods were passed through the holes, a tensile load was applied at a rate of 5 mm/min by using a Tensilon universal testing machine RTC-1225, and the breakdown load and elongation at break were measured.

Production Example 1 [Production Method of Compound 1-1]

A total of 0.01 g of dimethyltin dichloride as a polymerization catalyst was added to 30.6 g of 4,4'-diphenylmethane diisocyanate, which is a polyisocyanate compound having an aromatic ring, in a 300 ml eggplant-shaped flask, and dissolution was performed under a nitrogen atmosphere at 50° C. with a stirrer for 30 min.

Next, 69.4 g of polyoxyethylene monomethacrylate (trade name: BLEMMER PE-200, manufactured by NOF Corporation) was compounded as a polyol compound and stirring was performed for 60 min at 50° C. under a nitrogen atmosphere to obtain Compound 1-1.

Example 1

A total of 84 g of Compound 1-1, 16 g of polyethylene glycol diacrylate (trade name: NK ESTER A-200, manufactured by Shin-Nakamura Chemical Co., Ltd., average number of moles added of ethylene glycol: 4), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.15 g of a mixture of butoxyethyl acid phosphate and dibutoxyethyl acid phosphate (mass ratio 5:5) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm polytetrafluoroethylene (referred to hereinbelow as "PTFE")•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Example 2

A total of 84 g of Compound 1-1, 16 g of ethoxylated bisphenol A dimethacrylate (trade name: BPE-500, manufactured by Shin-Nakamura Chemical Co., Ltd., average number of moles added of ethylene glycol: 10 (calculated for both ends)), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.15 g of a mixture of butoxyethyl acid phosphate and dibutoxyethyl acid phosphate (mass ratio 5:5) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Example 3

A total of 84 g of Compound 1-1, 16 g of polyethylene glycol dimethacrylate (trade name: NK ESTER 4G, manufactured by Shin-Nakamura Chemical Co., Ltd., average number of moles added of ethylene glycol: 4), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.15 g of a mixture of butoxyethyl acid phosphate and dibutoxyethyl acid phosphate (mass ratio 5:5) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Example 4

A total of 84 g of Compound 1-1, 16 g of trimethylolpropane trimethacrylate (trade name: NK ESTER TMPT, manufactured by Shin-Nakamura Chemical Co., Ltd.), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.15 g of a mixture of butoxyethyl acid phosphate and dibutoxyethyl acid phosphate (mass ratio 5:5) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Example 5

A total of 90 g of Compound 1-1, 10 g of polyethylene glycol diacrylate (trade name: NK ESTER A-200, manufactured by Shin-Nakamura Chemical Co., Ltd.), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.15 g of a mixture of butoxyethyl acid phosphate and dibutoxyethyl acid phosphate (mass ratio 5:5) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Example 6

A total of 94 g of Compound 1-1, 6 g of polyethylene glycol diacrylate (trade name: NK ESTER A-200, manufactured by Shin-Nakamura Chemical Co., Ltd.), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.15 g of a mixture of butoxyethyl acid phosphate and dibutoxyethyl acid phosphate (mass ratio 5:5) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Example 7

A total of 97 g of Compound 1-1, 3 g of polyethylene glycol diacrylate (trade name: NK ESTER A-200, manufactured by Shin-Nakamura Chemical Co., Ltd.), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.15 g of a mixture of butoxyethyl acid phosphate and dibutoxyethyl acid phosphate (mass ratio 5:5) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Reference Example 1

Acrylic Spectacle Lens Substrate

A total of 80 g of ethoxylated bisphenol A dimethacrylate (trade name: BPE-100, manufactured by Shin-Nakamura Chemical Co., Ltd.), 20 g of ethoxylated bisphenol A dimethacrylate (trade name: BPE-500, manufactured by Shin-Nakamura Chemical Co., Ltd.), 0.1 g of 2,2'-azobis (2,4-dimethylvaleronitrile) (trade name: V-65 manufactured by Wako Pure Chemical Industries, Ltd.) as a radical initiator, 0.07 g of the above-described Compound 3-1 as a photochromic compound, and 0.001 g of modified silicone oil (trade name: KF-353A, manufactured by Shin-Etsu Chemical Co., Ltd.) as a release agent were placed into a 300 mL eggplant-shaped flask and dissolution was performed under stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 40° C. to a final temperature of 100° C. to obtain a spectacle lens substrate having a thickness of 2.0 mm. The spectacle lens substrate was further annealed for 2 h at 100° C.

Comparative Example 1

Urethane Spectacle Lens Substrate

A total of 50 g of 2,5(2,6)-bis(isocyanatomethyl)bicyclo heptane (trade name: MR-8A solution, manufactured by Mitsui Chemicals, Inc.), 0.01 g of dimethyltin dichloride as a radical initiator, and 0.07 g of the above-described Compound 3-1 as a photochromic compound were placed into a 300 mL eggplant-shaped flask, 0.15 g of a mixture of butoxyethyl acid phosphate and dibutoxyethyl acid phosphate (mass ratio 5:5) was added as a release agent, and dissolution was performed under stirring for 10 min at 15° C. by using a stirrer. Then, 25 g of MR-8B1 (trade name: MR-8B1 solution, manufactured by Mitsui Chemicals, Inc.) and 25 g of MR-8B2 (trade name: MR-8B2 solution, manufactured by Mitsui Chemicals, Inc.) were added as polythiol compounds, followed by stirring. Then, stirring was performed for 30 min under reduced pressure at 0.5 kPa to prepare a composition. This composition was filtered using a 1.0 μm PTFE•membrane filter. The filtrate was poured into a mold made of a glass mold and a tape. Casting polymerization was carried out for 24 h at a temperature program from 20° C. to a final temperature of 120° C. to obtain a spectacle lens substrate having a thickness of 2.0 mm. The spectacle lens substrate was further annealed for 2 h at 120° C.

TABLE 1

| | | Example 1 | Example 2 | Example 3 | Example 4 |
|---|---|---|---|---|---|
| Composition (g) | Compound 1-1 | 84 | 84 | 84 | 84 |
| | A-200 | 16 | | | |
| | BPE-500 | | 16 | | |
| | 4G | | | 16 | |
| | TMPT | | | | 16 |
| | Photochromic compound 3-1 | 0.07 | 0.07 | 0.07 | 0.07 |
| Light transmittance at the time of color development (T %$_{max}$) | | 16.0% | 17.8% | 26.4% | 23.8% |
| 60% T fading time (sec) | | 280 | 900 | 900 | 810 |

TABLE 2

| | | Example 1 | Example 5 | Example 6 | Example 7 |
|---|---|---|---|---|---|
| Composition (g) | Compound 1-1 | 84 | 90 | 94 | 97 |
| | A-200 | 16 | 10 | 6 | 3 |
| | Photochromic compound 3-1 | 0.07 | 0.07 | 0.07 | 0.07 |
| Light transmittance at the time of color development (T %$_{max}$) | | 16.0% | 15.8% | 16.1% | 20.3% |
| 60% T fading time (sec) | | 280 | 900 | 900 | 900 |
| Tensile test | Breakdown load (kgf) | 23.9 | 19.6 | 24.5 | 24.3 |
| | Elongation at break (mm) | 1.86 | 2.48 | 2.40 | 2.17 |

TABLE 3

| | | Reference Example 1 | Comparative Example 2 |
|---|---|---|---|
| Composition (g) | BPE100 | 80 | |
| | BPE500 | 20 | |
| | MR-8A | | 50 |
| | MR-8B1 | | 25 |
| | MR-8B2 | | 25 |
| | Photochromic compound 3-1 | 0.07 | 0.07 |

TABLE 3-continued

|  |  | Reference Example 1 | Comparative Example 2 |
|---|---|---|---|
| Light transmittance at the time of color development (T $\%_{max}$) |  | 19.0% | No coloring or fading |
| 60% T fading time (sec) |  | 390 | No coloring or fading |
| Tensile test | Breakdown load (kgf) | 15.0 | 51.2 |
|  | Elongation at break (mm) | 0.80 | 2.02 |

Various components shown in the tables are described in details hereinbelow.

Compound 1-1: The Following Compound 1-1:

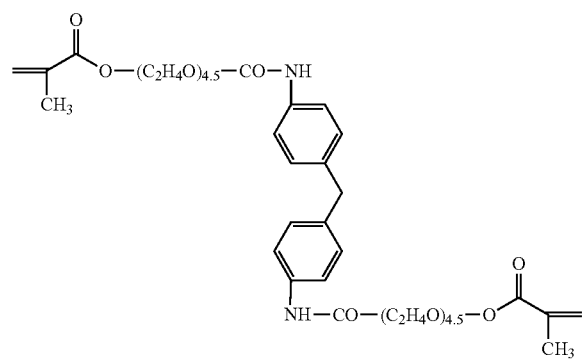

1-1

A-200: polyethylene glycol diacrylate (trade name: A-200, manufactured by Shin-Nakamura Chemical Co., Ltd., average number of moles added of ethylene glycol: 4);

BPE-500: ethoxylated bisphenol A dimethacrylate (trade name: BPE-500, manufactured by Shin-Nakamura Chemical Co., Ltd., average number of moles added of ethylene glycol: 10 (total for both ends));

4G: polyethylene glycol dimethacrylate (trade name: NK Ester 4G, manufactured by Shin-Nakamura Chemical Co., Ltd., average number of moles added of ethylene glycol: 4);

TMPT: trimethylolpropane trimethacrylate (trade name: NK Ester TMPT, manufactured by Shin-Nakamura Chemical Co., Ltd.);

Photochromic Compound 3-1: chromene compound which is Compound 3-1 (molecular weight: 741.87);

BPE-100: ethoxylated bisphenol A dimethacrylate (trade name: NK Ester BPE-100, manufactured by Shin-Nakamura Chemical Co., Ltd.);

MR-8A: 2,5(2,6)-bis(isocyanatomethyl)bicyclo [2.2.1] heptane (trade name: MR-8A solution, manufactured by Mitsui Chemicals, Inc.);

MR-8B1: polythiol (trade name: MR-8B1 solution, manufactured by Mitsui Chemicals, Inc.);

MR-8B2: polythiol (trade name: MR-8B 2 solution, manufactured by Mitsui Chemicals, Inc.).

According to the results shown in Table 1 and the results of Comparative Example 1 shown in Table 3, it can be understood that excellent coloring performance is exhibited as a result of using the urethane acrylate according to the present disclosure. Further, according to the results shown in Table 2 and the results of Reference Example 1 shown in Table 3, it can be understood that excellent toughness superior to that of the conventional acrylic spectacle lens substrates is obtained as a result of using the urethane acrylate according to the present disclosure.

Finally, the embodiments of the present disclosure are summarized.

One embodiment of the present disclosure is a polymerizable composition for an optical component, including a urethane acrylate represented by general formula (1), and a photochromic compound:

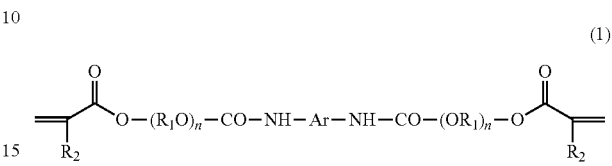

(1)

wherein, in the formula, Ar represents a residue obtained by removing an isocyanate group from an aromatic diisocyanate compound, $R_1$ represents an alkanediyl group having 2 to 4 carbon atoms, and $R_2$ represents a hydrogen atom or a methyl group; n represents an average number of moles added, and is 2 to 8.

It is conceivable that by including the urethane acrylate represented by general formula (1), it is possible to obtain an optical component which has excellent coloring performance and in which structural changes of the photochromic compound caused by light in the resin matrix are unlikely to be inhibited even in the composition after curing.

It should be noted that the embodiment disclosed herein is merely exemplary in all aspects and is not intended to be restrictive. The scope of the present disclosure is defined by the claims, rather than by the description, and is intended to be inclusive of meanings equivalent to the claims and all changes within the scope thereof.

The invention claimed is:

1. A polymerizable composition for an optical component, comprising a urethane acrylate represented by general formula (1), and a photochromic compound:

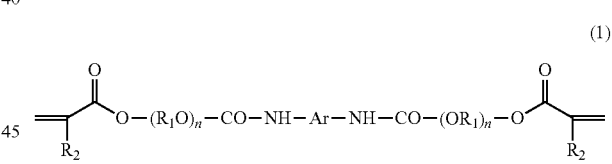

(1)

wherein Ar represents a residue obtained by removing an isocyanate group from an aromatic diisocyanate compound, $R_1$ represents an alkanediyl group having 2 to 4 carbon atoms, and $R_2$ represents a hydrogen atom or a methyl group; n represents an average number of moles added, and is 2 to 8, and wherein a content of the urethane acrylate in the composition is 60% by mass to 99% by mass.

2. The polymerizable composition according to claim 1, wherein Ar has a structure represented by general formula (a):

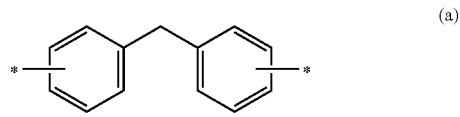

(a)

wherein * represents a bonding site.

3. The polymerizable composition according to claim 1, wherein the photochromic compound has a molecular weight of 800 or less.

4. The polymerizable composition according to claim 1, wherein a content of the photochromic compound in the composition is 0.01% by mass to 0.1% by mass.

5. The polymerizable composition according to claim 1, further comprising a polyfunctional (meth)acrylate.

6. The polymerizable composition according to claim 5, wherein the polyfunctional (meth)acrylate is a (poly)alkylene glycol di(meth)acrylate.

7. The polymerizable composition according to claim 6, wherein the polyfunctional (meth)acrylate is a (poly)alkylene glycol diacrylate.

8. The polymerizable composition according to claim 5, wherein a content of the polyfunctional (meth)acrylate in the composition is 1% by mass to 40% by mass.

9. An optical component obtained by polymerizing the polymerizable composition according to claim 1.

10. A spectacle lens substrate comprising the optical component according to claim 9.

11. The polymerizable composition according to claim 2, wherein the binding site * is at a 4,4'-position or a 2,4'-position.

12. The polymerizable composition according to claim 11, wherein the binding site * is at the 4,4'-position.

13. The polymerizable composition according to claim 1, wherein the aromatic diisocyanate compound is selected from the group consisting of 4,4'-diphenylmethane diisocyanate, 2,4'-diphenylmethane diisocyanate, 2,6-tolylene diisocyanate, 2,4-tolylene diisocyanate, paraxylylene diisocyanate, and metaxylylene diisocyanate.

14. The polymerizable composition according to claim 13, wherein the aromatic diisocyanate compound is 4,4'-diphenylmethane diisocyanate.

15. The polymerizable composition according to claim 1, wherein a content of the urethane acrylate in the composition is 70% by mass to 95% by mass.

16. The polymerizable composition according to claim 1, wherein a content of the urethane acrylate in the composition is 80% by mass to 87% by mass.

17. The polymerizable composition according to claim 1, wherein the photochromic compound has a molecular weight of 300 to 800.

18. The polymerizable composition according to claim 1, wherein the photochromic compound has a molecular weight of 500 to 750.

* * * * *